United States Patent [19]
Maroney et al.

[11] Patent Number: 5,205,321
[45] Date of Patent: Apr. 27, 1993

[54] TWO-WAY HYDRAULIC VALVE WITH ONE WAY TIME DELAY

[75] Inventors: George Earl Maroney, Clarkston; Larry P. Bennett, Franklin; Mark B. Chamberlin, Royal Oak; Fred L. Stark, Clarkston, all of Mich.

[73] Assignee: M. C. Aerospace Corporation, Lake Orion, Mich.

[21] Appl. No.: 795,539

[22] Filed: Nov. 21, 1991

[51] Int. Cl.⁵ ............................................. F16K 17/18
[52] U.S. Cl. .................... 137/493.3; 137/514.7
[58] Field of Search ................... 91/35, 41, 44, 45; 137/514.5, 514.7, 493.1–493.5

[56] References Cited

U.S. PATENT DOCUMENTS

| | | | |
|---|---|---|---|
| 1,942,313 | 1/1934 | Viele | 137/493.3 |
| 3,359,862 | 12/1967 | Modrich | 91/44 X |
| 3,605,802 | 9/1971 | Hertell | 137/514.5 |

Primary Examiner—Robert G. Nilson
Attorney, Agent, or Firm—Joseph W. Farley

[57] ABSTRACT

A two-way, inline, hydraulic valve through which fluid can flow in reverse and in forward directions has a reverse flow passage including a check valve preventing forward direction fluid flow therethrough. Forward direction fluid flow is controlled by a movable, spring-biased, normally closed, spool valve having one end exposed to forward direction fluid pressure and an opposite end forming a piston acting in a cylindrical cavity containing a volume of fluid. Movement of the spool valve to open position in response to forward direction fluid pressure sufficient to overcome the spring bias causes the volume of fluid to be forced from the cavity through a restricted passage, thereby providing a time delay in the opening of the two-way valve for forward direction fluid flow. In an alternative embodiment, a sleeve valve mounted on the spool valve provides a by-pass permitting forward direction fluid flow under abnormally low forward direction fluid pressure.

20 Claims, 3 Drawing Sheets

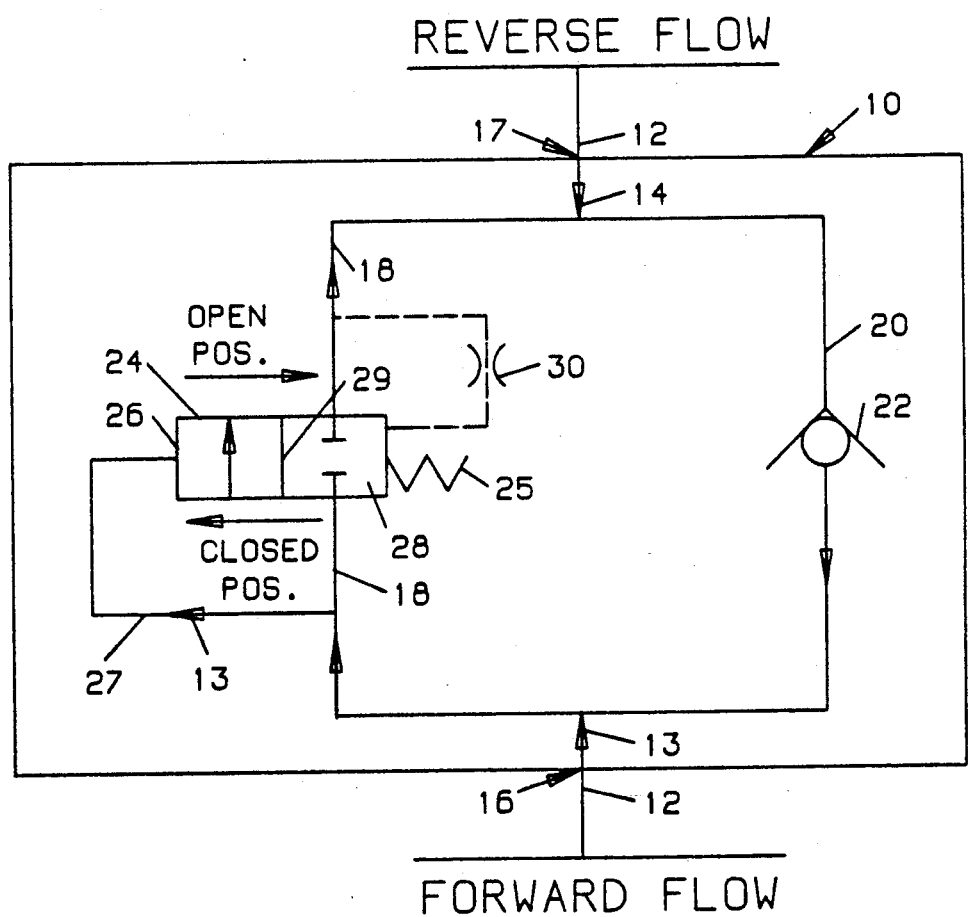

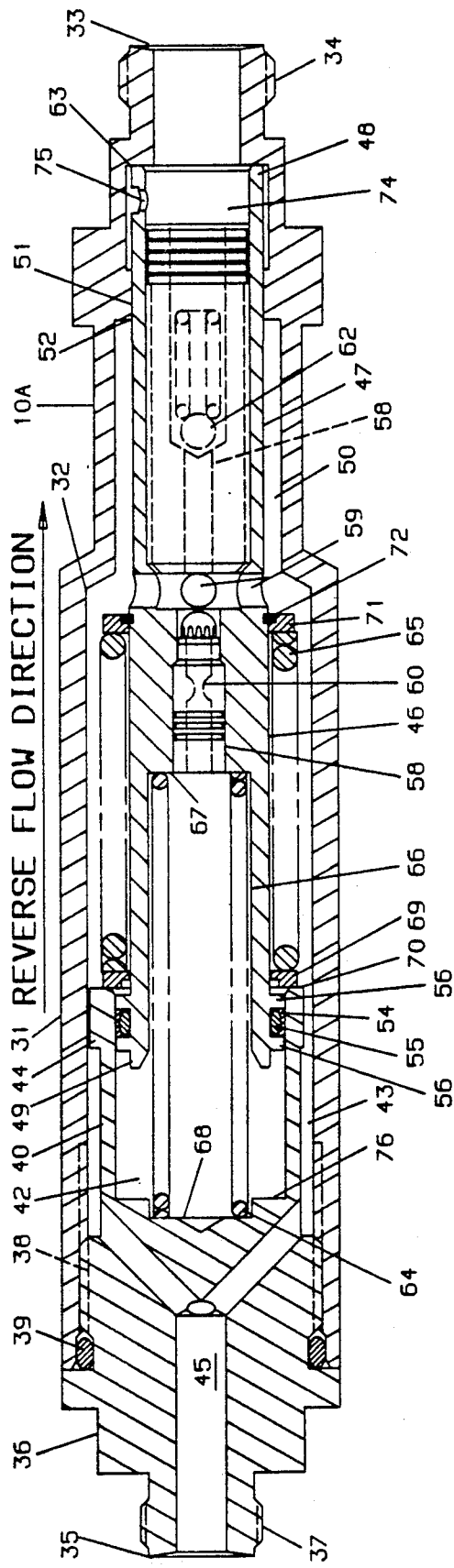
FIG. 2 REVERSE FLOW DIRECTION
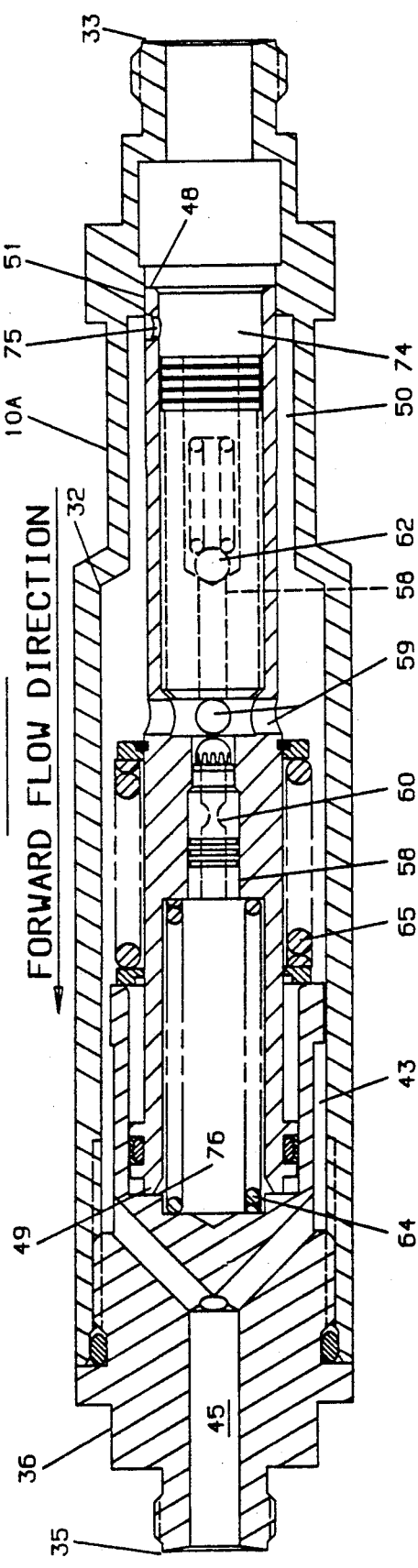
FIG. 3 FORWARD FLOW DIRECTION

TWO-WAY HYDRAULIC VALVE WITH ONE WAY TIME DELAY

SUMMARY OF THE INVENTION

This invention relates to a two-way, or bi-directional flow hydraulic valve permitting free fluid flow in a reverse or return flow direction and providing a time delay opening for fluid flow in a forward or actuating direction.

Hydraulic systems frequently require the sequential application of fluid pressure to plural hydraulic actuators in response to the operation of a single control. A hydraulic aircraft landing gear system, for example, may include hydraulically actuated devices which lock the gear in its extended and retracted positions in addition to the hydraulically actuated mechanism which moves the gear between those positions. Proper operation of the system in either the down or up direction requires that the relevant locking device be actuated and released prior to the actuation of the gear moving mechanism. Such proper operation can readily and simply be attained by the installation of the two-way hydraulic valves of the invention in series with the hydraulic actuator for the gear moving mechanism. Each of the valves to be disclosed herein is an inline type adapted for installation in a conduit through which hydraulic fluid can flow in a forward, actuating direction and in a reverse, return direction.

A basic form of a two-way hydraulic valve of the invention comprises a valve body having opposite front and rear ends each provided with a conduit connector. A forward flow passage and a reverse flow passage extending between the opposite ends permit fluid flow through the valve body from the front to rear ends and from the rear to front ends in the forward and reverse directions respectively. A check valve in the reverse flow passage prevents fluid flow therethrough in the forward direction. Fluid flow through the forward flow passage is controlled by a spool moveable in the valve body between a closed forward flow position and an open forward flow position, the spool being spring biased to its closed forward flow position and being moveable to its open forward flow position in response to forward direction fluid pressure acting against one end of the spool. The opposite end of the spool forms a piston slidably engaging a cylindrical cavity provided in the valve body and containing a certain volume of fluid which must be displaced therefrom through a flow restrictor, thereby restricting the rate of movement of the spool to its open forward flow position and providing a time delay in the opening of the two-way valve under forward direction fluid pressure.

In a first embodiment of the construction of a two-way valve of the invention, the valve body is formed with a generally cylindrical internal chamber closed at the rear end of the valve body by a plug provided with one of the conduit connectors and with a portion projecting within the chamber, the projecting portion having the cylindrical cavity formed therein and being spaced radially inwardly of the chamber to form an annular clearance in fluid communication with the one conduit connector through a path extending through the plug. The spool is generally cylindrical, is mounted coaxially in the chamber, has a front end exposed to fluid pressure acting in the forward direction, and has an opposite end forming a piston slidably engaging the cylindrical cavity. A land on the valve body is slidably engaged by the front end portion of the spool. The intermediate portion of the spool is located radially inwardly of the chamber, separated therefrom by an axially extending annular space. An axial bore extends through the spool from the opposite end to the front end thereof and a radial passage in the spool intermediate its ends extends from the axial bore to the annular space. The flow restrictor is mounted in the axial bore of the spool between the spool's opposite end and the radial passage; the check valve is mounted in the axial bore between the radial passage and the front end of the spool. Biasing springs urge the spool to a closed forward flow position in which the front end of the spool engages an abutment on the valve body and in which a spool port, extending through the spool from the axial bore and located between the spool front end and the check valve, is blocked by the valve body land.

In this construction, a reverse flow passage from the rear to the front end of the valve body extends through the path in the plug, the annular clearance between the projecting portion of the plug and the chamber, the annular space between the spool and the chamber, the radial passage in the spool, and through the axial bore and check valve to the front end of the spool and the valve body. A forward flow passage includes a first portion extending internally of the spool through the axial bore to the spool port, and a second portion extending externally of the spool through the annular space, the annular clearance, and the path in the plug. This forward flow passage is blocked at the spool port by the land in the spring biased closed forward flow position of the spool. When forward direction fluid pressure is applied to the two-way valve, that pressure, acting against the front end of the spool, overcomes the spring bias and moves the spool to an open position in which the spool port is not blocked by the land and the first and second portions of the forward flow passage are in fluid communication. This opening movement of the spool requires that the volume of fluid contained in the cylindrical cavity be displaced therefrom by the opposite, piston end of the spool through the axial bore, the flow restrictor therein, and the radial passage, to the second external portion of the forward flow passage. The time required for the spool to move from its closed to its open forward flow position is determined by the volume of fluid to be displaced, the size of the flow restrictor, and the operating pressure, which in turn has a minimum value determined by the force necessary to overcome the biasing springs. Hence a desired time delay is obtainable by those skilled in the art.

A second embodiment of the invention modifies the two-way hydraulic valve described above to permit forward direction fluid flow in the event that forward direction fluid pressure should fall below a minimum operating valve. In this second embodiment, a sleeve valve having concentric inner and outer cylindrical surfaces respectively engaging the external surface of the front end portion of the spool and an internal guide surface on a fitting forming the front end of the valve body, is movable between forward and rearward positions defined by abutments on the valve body. A sleeve valve biasing spring normally urges the sleeve valve to the forward position with a biasing force less than that of the spool biasing springs which normally urge the spool to the forward, or closed position of the spool in the first embodiment. However, in these normal spring-biased positions of the sleeve valve and the spool, a sleeve valve port is in fluid communication with the spool port and permits fluid to flow in the forward direction from the first portion of the forward flow passage internally of the spool through the spool port, the sleeve valve port, and to the second portion of the forward flow passage externally of the spool. The two-way valve will remain in this condition and permit free fluid flow in the forward direction until forward direction fluid pressure, which acts against the front end of the sleeve valve, is sufficient to overcome the force of the sleeve valve biasing spring, or in other words is at an operating value.

The application of forward direction operating pressure to the two-way valve first forces the sleeve valve to its rearward position in which the sleeve valve closes the spool port. Then, the forward direction pressure acts against the spool, as in the first embodiment, and moves the spool to its open forward flow position in which the spool and sleeve valve ports are again in fluid communication. This second embodiment of the invention provides the same time delay opening under operating forward direction fluid pressure as does the first embodiment, but only if that pressure is at an operational level.

When the second embodiment two-way valve is connected in series with a hydraulic actuator for moving some device, such as the down movement of an aircraft landing gear, that movement can be effected by other means without being obstructed by the two-way valve, in the event of a loss of operating hydraulic pressure.

Other features and advantages of the invention will appear from the description to follow of the embodiments thereof disclosed in the accompanying drawings.

DESCRIPTION OF THE DRAWINGS

FIG. 1 is a schematic illustration of a two-way hydraulic valve of the invention;

FIG. 2 is a longitudinal sectional view showing a two-way hydraulic valve construction of a first embodiment of the invention in a reverse flow condition;

FIG. 3 is a longitudinal sectional view showing the valve of FIG. 2 in a forward flow condition;

DETAILED DESCRIPTION

Figure 4:
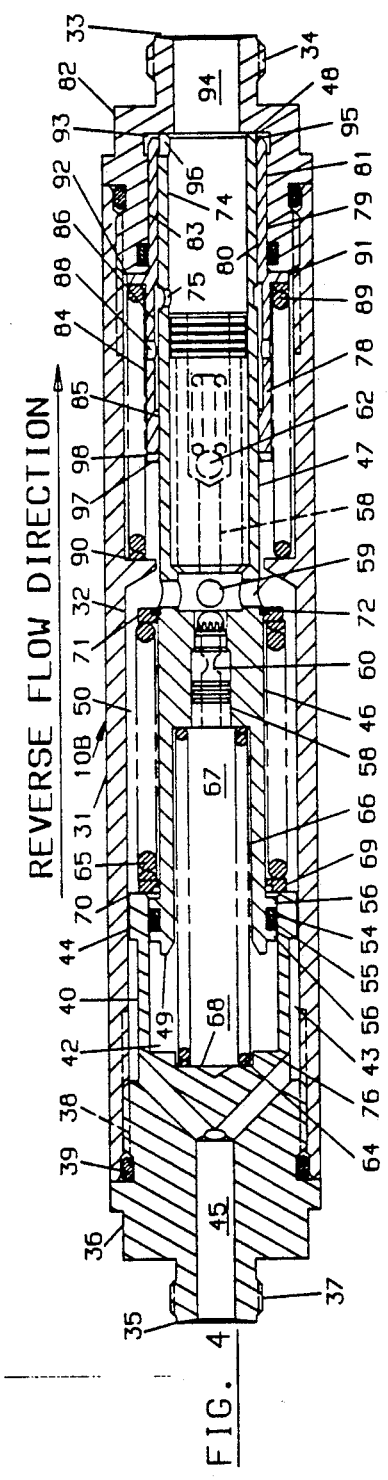
FIG. 4 is a longitudinal sectional view showing a two-way hydraulic valve construction of a second embodiment of the invention in a reverse flow condition.

FIG. 1 schematically illustrates the principal components of a two-way hydraulic valve 10 of the invention and their mode of operation. The valve 10 is installed in a conduit 12 through which fluid can flow in either a forward direction indicated buy the arrow 13 or a reverse direction indicated by the arrow 14. Within the valve 10, and extending between the opposite front and rear ends 16 and 17 thereof connected to the conduit 12, is a forward flow passage 18 and a reverse flow passage 20. A check valve 22 in the reverse flow passage 20 prevents fluid flow therethrough in the forward direction 13.

Fluid flow through the forward flow passage 18 is controlled by a spool valve 24 which is movable between a closed position (as shown) and an open position, is biased to the closed position by a spring 25, and is movable to the open position by forward direction fluid pressure acting against one end 26 of the spool valve 24 through a connection 27 from the forward flow passage 18. Opening movement of the spool valve 24 is restricted by fluid in a chamber 28 opposed to the other end 29 of the spool valve 24 and by the rate at which this fluid can be displaced from the chamber 28 through a flow restricting orifice 30.

When fluid pressure is applied to the valve 10 in the reverse direction 14 and the spool valve 24 is in its normal closed position, fluid flows from the rear end 17 to the front end 16 through the reverse flow passage 20 and check valve 22. When fluid pressure is applied to the valve 10 in the forward direction 13 and the spool valve 24 is in its normal closed position, fluid flow through the reverse flow passage 20 is prevented by the check valve 22. Fluid pressure acting through the connection 27 against the end 26 of the spool valve 24 and the spring 25 moves the spool valve toward its open position, forcing the fluid trapped in the chamber 28 through the orifice 30. Thus the opening of the valve 10 to full fluid flow in the forward direction 13 is delayed by the time required for the volume of trapped fluid to flow through the orifice 30.

FIGS. 2 and 3 show a two-way hydraulic valve 10A constructed in accordance with a first embodiment of the invention.

A valve body 31 of generally tubular cylindrical configuration forming an internal chamber 32, has a front end 33 provided with a fluid conduit connector 34 and a rear end 35 closed by a plug 36 provided with a conduit connector 37, a threaded connection 38 and sealing ring 39 being employed between the plug 36 and the valve body 31. A portion 40 of the plug 36 projects within the chamber 32, has a cylindrical cavity 42 formed therein, and is spaced radially inwardly of the chamber 32 to form an annular clearance 43 between the chamber 32 and the projecting portion 40 of the plug 36, except for circumferentically spaced stabilizing ribs 44 on the portion 40. A fluid communication path 45 extends from the conduit connector 37 axially and generally radially of the plug 36 to the annular clearance 43.

A spool 46 having a cylindrical outer surface 47, a front end 48, and an opposite end 49, is coaxially supported within the valve body internal chamber 32 and is separated therefrom by an axially extending annular space 50. A land 51 on the valve body 31 is slidably engaged by the cylindrical outer surface 47 of the spool 46 adjacent the front end 48 thereof; and, the land 51 defines an end wall 52 of the annular space 50 adjacent the front end 48 of the spool 46.

The opposite end 49 of the spool 46 forms a piston slidably engaging the cylindrical cavity 42, preferably with a seal 54 and packing 55 mounted between a pair of axially spaced radially projecting rings 56 formed on the spool. An axial bore 58 extends through the spool 46 from the opposite end 49 to the front end 48 and a radial passage 59 in the spool extends from the axial bore 58 intermediate the spool ends 49 and 48. A fluid flow restrictor 60 is mounted in the bore 58 between the opposite end 49 of the spool and the radial passage 59; a check valve 62 is mounted in a portion of the bore 58 between the radial passage 59 and the front end 48 of the spool 46.

First and second biasing springs 64 and 65 normally urge the spool 46 to a closed forward flow position shown in FIG. 2 and defined by abutment of the spool front end 48 against an annular shoulder 63 on the valve body 31 adjacent to the front end 33 thereof. The first biasing spring 64 is mounted in an axial cylindrical recess 66 in the opposite end 49 of the spool 46, between an annular surface 67 at the inner end of the recess 66 and a seat 68 on the plug 36. The second biasing spring 65 is mounted in the annular space 50 and acts between a ring 69 supported on the annular forwardly facing end surface 70 of the plug 36 and an annular stop 71 fixed to the spool 46 by a retainer 72.

When the spool 46 is in its normal closed forward flow position of FIG. 2, a reverse fluid flow passage extending from the rear end 35 to the front end 33 of the valve body 31 is formed by the flow path 45 in the plug 36, the annular clearance 43 between the plug projecting portion 40 and the chamber 32, the annular space 50 between the spool 46 and the chamber 32, the radial passage 59 in the spool, and through the check valve 62 in the axial bore 58 of the spool. A forward direction flow passage from the front end 33 to the rear end 35 of the valve body 31 includes a first portion formed internally of the spool 46 by the portion 74 of the axial bore 58 extending from the spool front end 48 to a spool port 75 extending radially through the spool 46; and, a second portion formed in the valve body externally of the spool 46. The second portion includes the annular space 50, the annular clearance 43, and the flow path 45 all of which are common to the reverse flow passage. The spool port 75 and the land 51 on the valve body 31 form a valve which controls forward direction fluid flow between the first and second portions of the forward flow passage, and as shown in FIG. 2, the land 51 blocks forward direction fluid flow through the spool port 75 to the second forward flow passage portion when the spool 46 is in its closed forward flow position.

Fluid pressure applied to the valve 10A in the forward direction acts against the front end 48 of the spool 46 (forward direction fluid flow through the axial bore 58 in the spool being prevented by the check valve 62), and moves the spool against the force of the first and second biasing springs 64 and 65 to the open forward flow position of FIG. 3, defined by abutment between the opposite end 49 of the spool and the bottom 76 of the cavity 42. The rate of movement of the spool 46 to the open forward flow position is restricted by the volume of fluid contained in the cavity 42 which must be forced therefrom to the forward flow passage portion 50 through the restrictor 60 and radial passage 59 by the opposite end 49 of the spool acting as a piston in the cavity 42. A time delay results in the opening of the valve 10A in response to the application thereto of forward direction fluid pressure. Hence, if two actuating devices are operated from the same fluid pressure conduit, connecting the valve 10A in series with one of these devices will insure the prior operation of the other device under forward direction fluid pressure.

Figure 5:
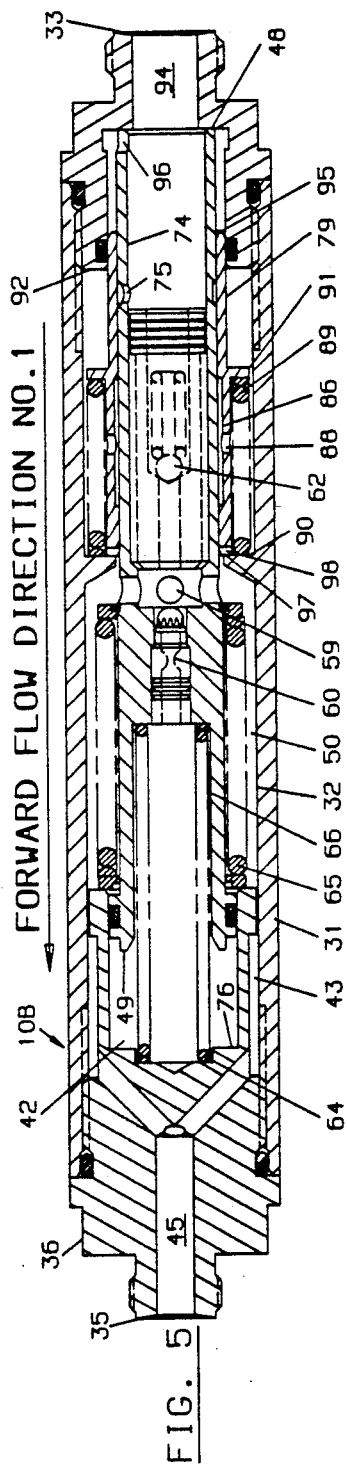
FIG. 5 is a longitudinal sectional view showing the valve of FIG. 4 in an initial forward flow condition.
Figure 6:
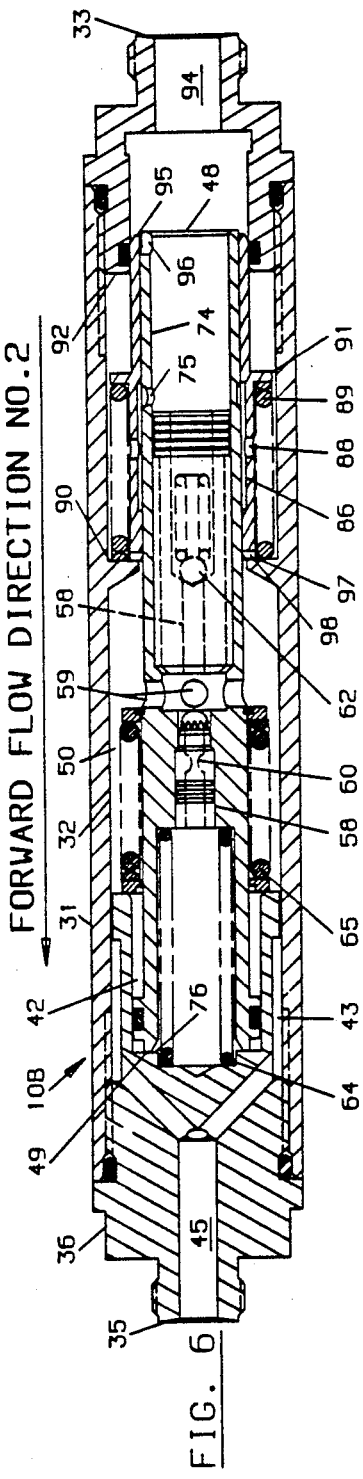
FIG. 6 is a longitudinal sectional view showing the valve of FIG. 4 in an open forward flow condition.

FIGS. 4-6 show a two-way hydraulic valve 10B incorporating components similar to those of valve 10A and identified by the same reference numbers. In the valve 10B, however, forward direction fluid flow between the first portion 74 of the forward flow passage internally of the spool 46 through the spool port 75 to the second portion of the forward flow passage externally of the spool is additionally controlled by a sleeve valve 78 slidably mounted on the outer cylindrical surface 47 of the spool 46 adjacent the front end 48 thereof.

The sleeve valve 78 has a front end portion 79 provided with concentric inner and outer surfaces 80 and 81, the inner surface 80 slidably engaging the spool surface 47 and forming an end land on the sleeve valve, the outer surface 81 slidably engaging a cylindrical guide surface 83 provided on a fitting 82 threaded into the valve body chamber 32 and forming the front end 33 of the valve body. The fitting surface 83 slidably supports the sleeve valve 78 and the spool 46 coaxially of the valve chamber 32.

A skirt portion 84 of the sleeve valve 78 extends axially from the front end portion 79 towards the opposite end 49 of the spool 46 and has an inner surface 85 forming another end land slidably engaging the outer surface 47 of the spool. A recess 86 in the sleeve valve between the axially spaced inner surfaces or end lands 80 and 85 provides an annular flow path between the end lands, and a port 88 extends through the sleeve valve from this annular flow path.

A sleeve valve biasing spring 89 is mounted in the axially extending annular space 50 separating the spool 46 from the chamber 32 between a radially inwardly projecting ledge 90 formed on the valve body 31 and an annular collar 91 provided on the sleeve valve 78 between the front end portion 79 and the skirt portion 84 thereof. The spring 89, which exerts a biasing force less than the spool biasing springs 64 and 65 combined, urges the sleeve valve 78 to a forward position, shown in FIG. 4, defined by contact between the sleeve valve collar 91 and an abutment surface 92 on the end fitting 82, which abutment surface 92 extends radially inwardly of the valve chamber 32 and defines the forward end of the space 50. The spool biasing springs 64 and 65 urge the spool 46 to a forward position corresponding to the closed forward flow position of the spool of the valve 10A an defined by engagement of the front end 48 of the spool with an annular shoulder 93 extending radially outwardly from an internal conduit portion 94 of the end fitting 82. The front 95 of the sleeve valve, in the forward position thereof, is spaced axially rearwardly of the shoulder 93, but can be exposed to fluid pressure by a by-pass between the shoulder and the front end 48 of the spool formed by a notch 96 therein.

When the valve 10B is subjected to fluid flow in the reverse direction, the spool 46 and the sleeve valve 78 are in a first relative position shown in FIG. 4. A reverse flow passage extends between the opposite ends 35 and 33 of the valve through the flow path 45, the annular clearance 43, the annular space 50, the spool radial passage 59, and the bore 58 and check valve 62 in the spool. Some fluid can also flow in the reverse direction from the annular space 50 through the sleeve valve port 88 and the spool port 75 to the portion 74 of the spool bore.

The application to the valve 10B of forward direction fluid pressure in an amount not sufficient to overcome the force of the sleeve valve biasing spring 89, i.e., pressure below a normal operating value, results in the spool 46 and the sleeve valve 78 remaining in their first relative position shown in FIG. 4. Fluid can flow in the forward direction from the spool bore portion 74 through the spool port 75, the axial recess 86 in the sleeve valve 78, and the sleeve valve port 88 to the rear end 35 of the valve through the annular space 50, the annular clearance 43 and the flow path 45. Thus, under a low or no pressure condition, the valve 10B will not impede movement of a hydraulic actuating device with which it is series connected.

Forward direction, operating value fluid pressure applied to the valve 10B in the FIG. 4 condition acts against the spool and the front end 95 of the sleeve valve 78 through the by-pass 96. This fluid pressure first overcomes the lesser biasing force of the sleeve valve spring 89 and moves the sleeve valve on the spool to a rearward position defined by abutment between the sleeve valve rear end 97 and the ledge 90, as shown in FIG. 5.

In this second relative position between the sleeve valve 78 and the spool 46, the front end land 79 on the sleeve valve blocks the spool port 75. Forward direction fluid flow is obstructed by the sleeve valve, forward direction fluid pressure is applied entirely to the spool 46, and the spool 46 is moved against the force of the biasing springs 64 and 65 at a rate determined by the displacement of fluid from the cavity 42 through the restrictor 60, as previously described for the valve 10A. As shown in FIG. 6, the sleeve valve 78 and the spool 46 return tho their first relative position in which fluid can flow in the forward direction from the internal spool passage portion 74 through the spool port 75 and the sleeve valve port 88 to the external portion 50 of the forward direction flow passage. Forward direction fluid flow between the rear end 97 of the sleeve valve 78 and the ledge 90 engaged thereby is insured by a plurality of notches 98 formed in the end 97.

The valve 10B under normal operating pressure conditions provides the same time-delay opening under forward direction pressure as does the valve 10A. The additional sleeve valve 78 of the valve 10B in effect provides a low pressure by-pass feature for forward direction fluid flow. In an installation in which the valve 10B is hydraulically connected in series with an actuator in turn mechanically connected to a part movable thereby, this by-pass feature permits that part to be moved by alternative means in the event of a hydraulic malfunction or failure.

We claim:

1. A two-way hydraulic valve adapted to be installed in a conduit through which fluid can flow in a forward direction and a reverse direction comprising:
    a valve body having opposite front and rear ends each provided with a conduit connector;
    forward and reverse flow passage means extending between said opposite ends for permitting fluid flow through said valve body from said front to rear ends and from said rear to front ends in said forward and reverse directions respectively;
    check valve means in said reverse flow passage means for preventing fluid flow therethrough in said forward direction;
    spool means moveable in said valve body between a closed forward flow position and an open forward flow position for controlling fluid flow through said forward flow passage means, spool biasing means for normally urging said spool means to said closed forward flow position, said spool means being moveable to said open forward flow position in response to fluid pressure acting in said forward direction against said spool means; and
    hydraulic damping means for restricting the rate of movement of said spool means to said open forward flow position whereby the opening of said forward flow passage means is delayed when fluid pressure is applied to said valve in said forward direction.

2. A two-way hydraulic valve according to claim 1 wherein said forward flow passage means includes a first portion formed internally of said spool means, and a second portion formed in said valve body externally of said spool means, said first and second portions being arranged for fluid flow therebetween only in said open forward flow position of said spool means.

3. A two-way hydraulic valve according to claim 1 wherein
    said spool means has a front end opposed to fluid flow in said forward direction, an opposite end, and a generally cylindrical outer surface between said ends;
    said forward flow passage means includes a first portion formed by a bore extending axially in said spool means from said front end thereof to a spool port extending radially from said bore through said spool means, a second portion formed in said valve body externally of said spool means; and
    valve means associated with said spool means for controlling forward direction fluid flow between said first and second portions of said forward flow passage means.

4. A two-way hydraulic valve according to claim 3 wherein said valve means comprises a land on said valve body slidably engaged by said cylindrical surface of said spool means adjacent the said front end thereof, said land in said closed forward flow position of said spool means blocking forward direction fluid flow through said spool port to said second forward flow passage portion.

5. A two-way hydraulic valve according to claim 4 wherein said valve body is formed with a generally cylindrical internal chamber, said spool means is arranged with said cylindrical outer surface thereof positioned substantially coaxially of said chamber and spaced radially inwardly thereof to provide an annular space between said spool means and said chamber, said annular space forming at least part of said second portion of said forward flow passage means.

6. A two-way hydraulic valve according to claim 5 wherein said land projects radially inwardly of said chamber and defines an end wall of said annular space adjacent to the said front end of said spool means.

7. A two-way hydraulic valve according to claim 3 wherein said valve means comprises:
    a sleeve valve slidably mounted on said outer surface of said spool means at said front end thereof;
    said sleeve valve surrounding said first portion of said forward flow passage means in said spool means, said sleeve valve and spool means being movable between first and second relative positions in which said sleeve valve respectively permits and obstructs forward direction fluid flow between said first and second portions of said forward flow passage means; and
    sleeve valve biasing means for normally urging said sleeve valve to said first relative position, said sleeve valve biasing means exerting a biasing force less than said spool biasing means;
    said sleeve valve being movable to said second relative position in response to fluid pressure of an operating value sufficient to overcome said sleeve valve biasing means, whereby said sleeve valve permits forward direction fluid flow through said two-way hydraulic valve under fluid pressure less than said operating value, said spool means being movable to said open forward flow position under operating value fluid pressure acting against said spool means in response to movement of said sleeve valve to said second relative position, said sleeve valve and spool means returning to said first relative position in said open forward flow position of said spool means.

8. A two-way hydraulic valve according to claim 7 wherein said sleeve valve is formed with end lands slidably engaging axially spaced portions of said outer surface of said spool means, an annular fluid flow path is provided by a recess in said sleeve valve between said end lands, and an outlet port extends through said sleeve valve from said annular fluid flow path, said spool port communicating with said annular fluid flow path in said first relative position of said sleeve valve and being blocked by one of said end lands in said second relative position of said sleeve valve.

9. A two-way hydraulic valve according to claim 7 wherein said valve body is formed with a generally cylindrical chamber,
said spool means is arranged with said cylindrical outer surface positioned substantially coaxially of said chamber and spaced radially inwardly thereof to provide an axially extending annular space between said spool means and chamber;
guide means extends radially inwardly of said chamber adjacent to the said front end of said spool means for supporting said sleeve valve and said spool means, said guide means having an abutment extending radially inwardly of said chamber, said abutment being located axially rearwardly of the said front end of said spool means and defining an end of said annular space;
said sleeve valve has a front end portion provided with concentric inner and outer surfaces slidably engageable respectively with said spool means and said guide means, a skirt portion extending axially from said front end portion towards the said opposite end of said spool means and having an inner surface slidably engaging said spool means, and a radially outwardly extending annular collar between said front end and skirt portions; and
said sleeve valve biasing means comprises a radially inwardly projecting annular ledge formed on said valve body axially rearwardly from said guide means, and a spring mounted in said annular space between said ledge and said collar, said spring normally urging said collar into engagement with said abutment to define the said first relative position of said sleeve valve in a normal position of said spool means resulting from the action of said spool biasing means.

10. A two-way hydraulic valve according to claim 9 wherein said skirt portion of said sleeve valve has a rearwardly facing end surface, said rearwardly facing end surface being engageable with said annular ledge to limit the movement of said sleeve valve in response to fluid pressure of said operating value and thereby return said sleeve valve and spool means to said first relative position in the forward flow position of said spool means,
a sleeve valve port extends through said skirt portion between said rearwardly facing end surface and said annular collar, said sleeve valve port being in fluid flow relation with said spool port in said first relative position of said sleeve valve and spool means.

11. A two-way hydraulic valve according to claim 10 further including means for insuring fluid flow in said forward direction from said sleeve valve port past said annular ledge.

12. A two-way hydraulic valve according to claim 11 wherein said guide means is provided on a fitting engaging said chamber and forming the front end of said valve body, said fitting including an axial internal conduit portion and an annular shoulder extending radially outwardly therefrom, said shoulder being engageable by the front end of said spool means to define said normal spool biasing spring urged position thereof.

13. A two-way hydraulic valve according to claim 12 wherein said sleeve valve front end is spaced axially rearwardly from said shoulder when said sleeve valve collar engages said abutment, and fluid by-pass means between said shoulder and spool means for exposing said sleeve valve front end to forward direction fluid pressure.

14. A two-way hydraulic valve according to claim 1 wherein said hydraulic damping means comprises:
a fluid containing cylindrical cavity provided in said valve body;
said spool means having a cylindrical configuration with a front end exposed to fluid pressure acting in said forward direction and with an opposite end forming a piston slidably engaging said cylindrical cavity; and
means for restricting the displacement of fluid from said cylindrical cavity by said piston in response to movement of said spool means to said open forward flow position by fluid pressure acting against said front end thereof in said forward direction.

15. A two-way hydraulic valve according to claim 14 wherein said spool means is provided with an axial bore extending from said opposite end through said piston, a radial passage extending from said axial bore to said forward flow passage means, and said restricting means comprises a fluid flow restrictor mounted in said axial bore.

16. A two-way hydraulic valve according to claim 14 wherein
said valve body is formed with a generally cylindrical internal chamber coaxial with said spool means and spaced radially outwardly therefrom to form an annular space extending axially therebetween;
plug means for closing said chamber at the said rear end of said valve body, said plug means being provided with one of said conduit connectors and with a portion projecting within said chamber, said projecting portion having said cylindrical cavity formed therein and being spaced radially inwardly of said chamber to form an annular clearance between said projecting portion and said chamber, a fluid communication path extending from said one conduit connector through said plug means to said annular clearance;
said annular space, said annular clearance, and said fluid communication path forming common portions of said forward and reverse flow passage means; and
valve means associated with said spool means and valve body for controlling forward direction fluid flow from the front end of said valve body to said common portion of said forward flow passage means.

17. A two-way hydraulic valve according to claim 16 wherein said spool means is provided with an axial bore extending therethrough from said opposite end to said front end thereof, a radial passage in said spool means intermediate said opposite and front ends extending from said axial bore, said restricting means comprises a fluid flow restrictor mounted in said axial bore between said opposite end and said radial passage, and said check valve means is mounted in a portion of said axial bore between said radial passage and said front end of said spool means.

18. A two-way hydraulic valve according to claim 17 wherein a cylindrical recess extends axially of said spool means from said opposite end thereof to an annular surface at the rearwardly facing end of said axial bore, said spool biasing means comprising a first biasing spring mounted in said cylindrical recess between said annular surface and a seat on said plug means, and a second biasing spring mounted in said annular space between said spool means and said valve body, said second biasing spring acting between an annular forwardly facing end surface of said plug means and an annular stop fixed to said spool means.

19. A two-way hydraulic valve according to claim 18 wherein said valve means comprises a spool port extending from said axial bore between said front end of said spool means and said check valve means, and a land on said valve body slidably engaged by said spool means adjacent said front end thereof, said land blocking forward direction fluid flow through said spool port to said annular space in said closed forward flow position of said spool means.

20. A two-way hydraulic valve according to claim 18 wherein said valve means comprises:

a spool port extending radially from said axial bore through said spool means between said front end thereof and said check valve means;

sleeve valve means slidably mounted on a portion of said spool means adjacent the front end thereof for axial movement relative to said spool port;

abutment means between said sleeve valve means and said valve body for defining a forward and a rearward position of said sleeve valve means;

sleeve valve biasing means for normally urging said sleeve valve means to said forward position, said sleeve valve biasing means having a biasing force less than that of said spool biasing means; and said sleeve valve means having an outlet port in fluid communication with said spool port in said forward position of said sleeve valve means and having an end land blocking said spool port in said rearward position of said sleeve valve means whereby said sleeve valve means permits forward direction fluid flow through said two-way hydraulic valve under fluid pressure less than that required to overcome said sleeve valve biasing means, said spool means being movable to said open forward flow position in response to fluid pressure in excess of that required to overcome said sleeve valve biasing means and in response to movement of said sleeve valve means to said rearward position thereby.

* * * * *